United States Patent
Matsuura

(10) Patent No.: US 7,126,909 B2
(45) Date of Patent: Oct. 24, 2006

(54) CENTRALIZED MANAGEMENT TECHNIQUE OF CALL CONTROL DATA

(75) Inventor: Yutaka Matsuura, Tokyo (JP)

(73) Assignee: NEC Corporation, Tokyo (JP)

( * ) Notice: Subject to any disclaimer, the term of this patent is extended or adjusted under 35 U.S.C. 154(b) by 876 days.

(21) Appl. No.: 09/871,653

(22) Filed: Jun. 4, 2001

(65) Prior Publication Data

US 2001/0048665 A1 Dec. 6, 2001

(30) Foreign Application Priority Data

Jun. 2, 2000 (JP) .............................. 2000-166103

(51) Int. Cl.
*H04J 1/16* (2006.01)
*G06F 15/16* (2006.01)

(52) U.S. Cl. ...................... 370/229; 709/217

(58) Field of Classification Search ................ 370/254, 370/389, 390, 431, 432; 709/217, 219, 203
See application file for complete search history.

(56) References Cited

U.S. PATENT DOCUMENTS

| | | | |
|---|---|---|---|
| 6,169,794 B1 * | 1/2001 | Oshimi et al. ................. | 707/1 |
| 6,173,312 B1 * | 1/2001 | Atarashi et al. ............ | 709/203 |
| 6,182,075 B1 * | 1/2001 | Hsu ............................ | 707/10 |
| 6,185,288 B1 * | 2/2001 | Wong ......................... | 379/219 |
| 6,405,250 B1 * | 6/2002 | Lin et al. .................... | 709/224 |
| 6,438,563 B1 * | 8/2002 | Kawagoe .................... | 707/201 |
| 6,446,108 B1 * | 9/2002 | Rosenberg et al. ......... | 709/203 |
| 6,615,201 B1 * | 9/2003 | Seshadri et al. ............... | 707/2 |
| 6,633,915 B1 * | 10/2003 | Hashimoto .................. | 709/228 |
| 6,643,707 B1 * | 11/2003 | Booth ........................ | 709/245 |
| 6,747,970 B1 * | 6/2004 | Lamb et al. ................. | 370/352 |
| 6,775,277 B1 * | 8/2004 | Li et al. ..................... | 370/389 |

FOREIGN PATENT DOCUMENTS

| | | |
|---|---|---|
| JP | A 7-160562 | 6/1995 |
| JP | 8-8903 | 1/1996 |
| JP | A 9-244938 | 9/1997 |
| JP | A 10-105500 | 4/1998 |
| JP | A 10-228403 | 8/1998 |
| JP | A 11-41252 | 2/1999 |
| JP | A 2000-35879 | 2/2000 |
| JP | B2 3274594 | 2/2002 |

* cited by examiner

*Primary Examiner*—Andrew C. Lee
(74) *Attorney, Agent, or Firm*—Young & Thompson

(57) ABSTRACT

A method allowing centralized call control data management and improved maintenance efficiency of call control data for a plurality of call agents distributed in the packet-based network is disclosed. Each of the call agents is set to be a client of a server, which stores master call control data required in respective ones of the call agents and manages the master call control data. Each of the call agents stores a copy of corresponding master call control data so that the call agents perform network-wide call control.

4 Claims, 8 Drawing Sheets

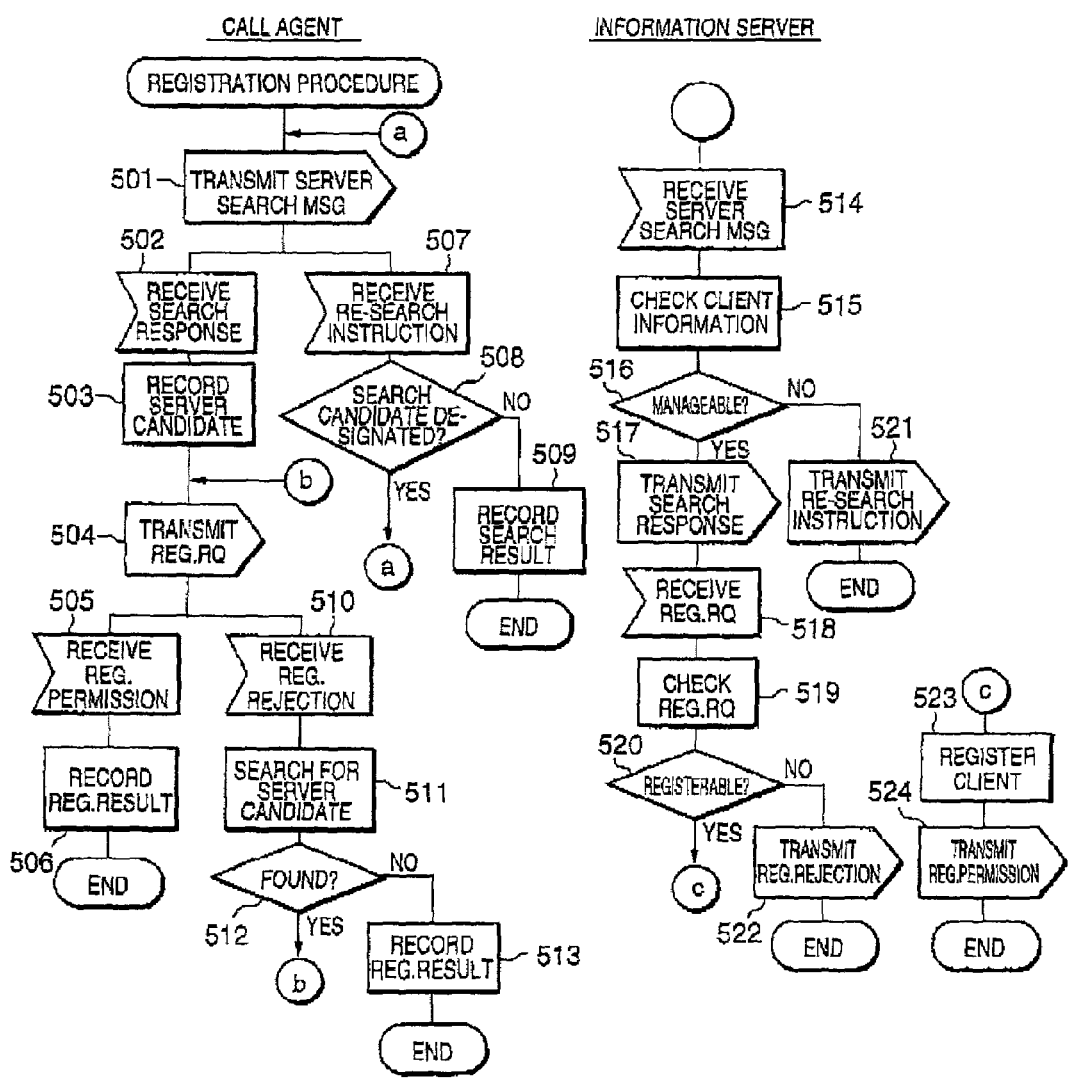

CENTRALIZED MANAGEMENT TECHNIQUE OF CALL CONTROL DATA

BACKGROUND OF THE INVENTION

1. Field of the Invention

The present invention relates to techniques for network-wide call control, and in particular to a management system and method for a plurality of call agents distributed in a packet-based network (PBN).

2. Description of the Related Art

In conventional multimedia techniques implemented in an existing packet-based network, plural call agents are distributed in the packet-based network and perform the network-wide call control based on call control data installed therein.

However, the call control data is individually set and installed in respective ones of the plural call agents. Accordingly, the efficiency of maintenance is reduced because the management of each call agent is not taken into consideration in the conventional techniques.

There has been disclosed a network management device allowing management of call control information transferred from an ISDN terminal via a packet-based network (see Japanese Patent Application Unexamined Publication No 8-8903).

However, call control data is changed due to data addition or deletion, or when restarting a call agent. In such a case, it is necessary to set the call control data stored in the call agent equal to that stored in the management device. The conventional network management device provides no means for data matching, data maintenance, or data checking procedure.

SUMMARY OF THE INVENTION

An object of the present invention is to provide a system and method allowing centralized call control data management for a plurality of call agents distributed in the packet-based network.

Another object of the present invention is to provide a system and method allowing improved maintenance efficiency of call control data stored in a plurality of call agents distributed in the packet-based network.

According to the present invention, a method for managing call control data installed in respective ones of a plurality of call agents which is distributed on a packet-based network, includes the steps of: a) setting each of the call agents to be a client of a server which is provided on the packet-based network; at the server, b) storing master call control data required in respective ones of the call agents; c) managing the master call control data; and at each of the call agents, d) storing a copy of corresponding master call control data so that the call agents perform network-wide call control.

Preferably, when a change occurs in the master call control data, the server may instruct a corresponding call agent to update call control data stored in the corresponding call agent so as to reflect the change.

The method may further include the steps of: transmitting a data check request from the server to a designated call agent; checking whether copied call control data stored in the designated call agent matches a corresponding master call control data stored in the server; and when the copied call control data does not match the corresponding master call control data, instructing the designated call agent to update the copied call control data so as to make it equal to the corresponding master call control data.

The method may further include the steps of: transmitting a data check request from a call agent to the server; checking whether copied call control data stored in the call agent matches a corresponding master call control data stored in the server; and when the copied call control data does not match the corresponding master call control data, updating the copied call control data so as to make it equal to the corresponding master call control data.

The step (a) may include the steps of: a.1) the call agent transmitting a server search message to a server; a.2) when receiving the server search message, the server determining whether the call agent can be managed; a.3) when it is determined that the call agent can be managed, the server transmitting a response message back to the call agent; a.4) when receiving the response message, the call agent transmitting a registration request to the server; a.5) when receiving the registration request, the server registering the call agent as a client when the call agent satisfies registration requirement.

When it is determined in the step (a.2) that the call agent cannot be managed, the server may transmit a re-search instruction message to the call agent, the re-search instruction message designating another server, wherein, when receiving the re-search instruction, the call agent transmits a server search message to the designated server.

According to anther aspect of the present invention, a system for managing call control data installed in respective ones of a plurality of call agents which is distributed on a packet-based network, includes: a server provided on the packet-based network, the server storing master call control data required in respective ones of the call agents; and a maintenance terminal provided on the packet-based network, the maintenance terminal performing maintenance of the master call control data by getting access to the server, wherein each of the call agents stores a copy of corresponding master call control data so that the call agents perform network-wide call control.

A plurality of servers may be provided on the packet-based network, the servers storing different types of master call control data required in respective ones of the call agents. In this case, each of the call agents stores a copy of each type of the master call control data so that the call agents perform network-wide call control.

A plurality of servers may be provided on the packet-based network, each of the servers storing master call control data required in respective ones of the call agents. In this case, each of the call agents is registered as a client of a different one of the servers to store a copy of corresponding master call control data.

As described above, a client/server concept is introduced to implement a centralized management of call control data installed in a plurality of call agents distributed in a packet-based network. Accordingly, information required for the network-wide call control can be easily and uniformly managed.

Further, the data checking procedure for matching data between client and server allows the data stored in each client to match the corresponding master data stored in the server.

Furthermore, the dynamic registration and its cancellation procedures allow easy and flexible change in client and server on the network.

BRIEF DESCRIPTION OF THE DRAWINGS

FIG. 6A is a flow chart showing a registration operation in a call agent according to the present invention;

FIG. 6B is a flow chart showing a registration operation in an information server according to the present invention;

DESCRIPTION OF THE PREFERRED EMBODIMENTS

First Embodiment

Figure 1:
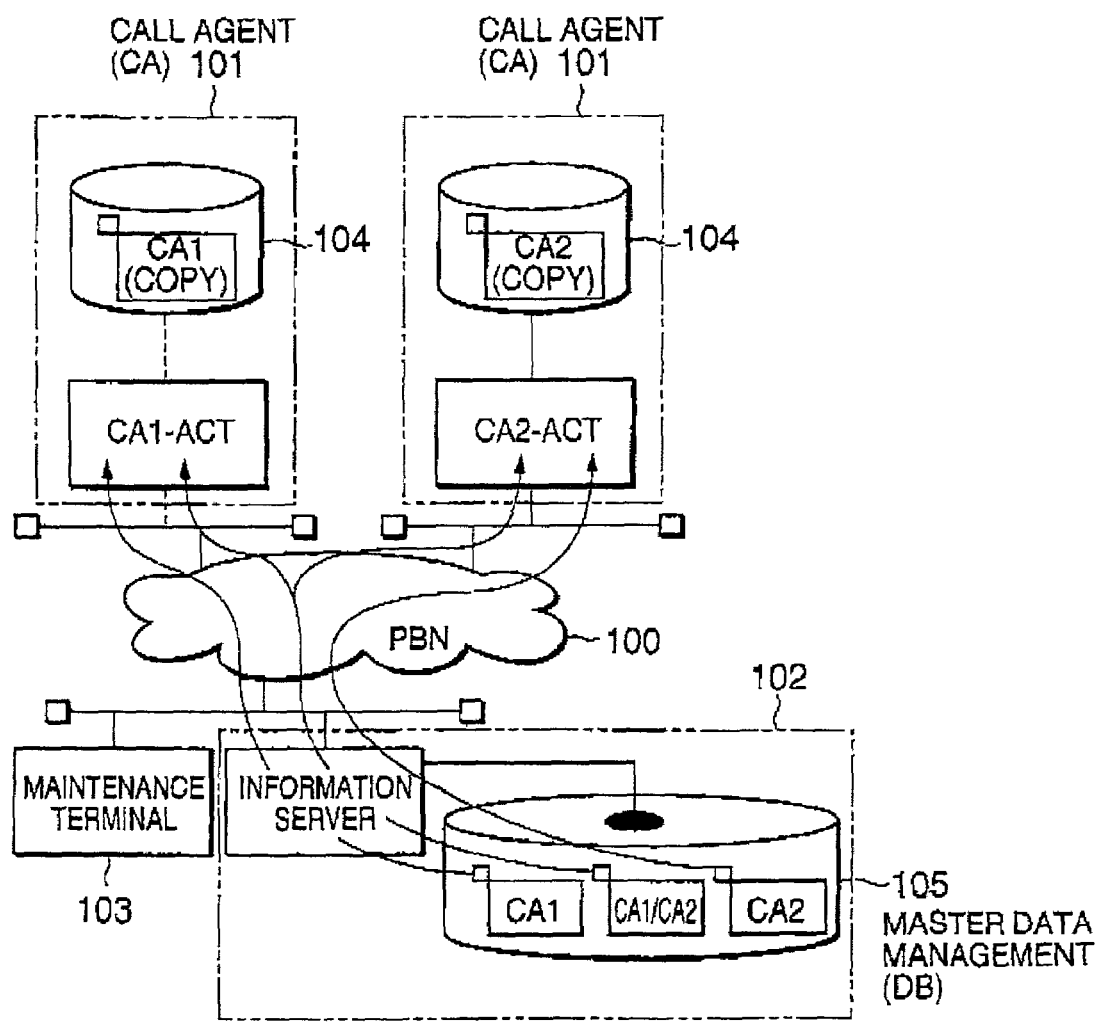
FIG. 1 is a diagram showing the configuration of a centralized call control data management system according to a first embodiment of the present invention.

Referring to FIG. 1, a centralized call control data management system according to a first embodiment of the present invention includes a plurality of call agents 101 which are distributed on a packet-based network (PSN) 100, an information server 102, and a maintenance terminal 103. Call control data implemented in respective ones of the call agents 101 are centrally managed by the information server 102, which is a server for data management.

The information server 102 has a master data management database 105 storing original call control data required for respective ones of the call agents 101. In FIG. 1, two call agents CA1 and CA2 are shown and the master data management database 105 stores original call control data required for respective ones of the call agents CA1 and CA2.

Each of the call agents 101 has a slave data management database 104 storing a copy of the corresponding master call control data managed by the information server 102.

As described later, when data addition, change, or deletion occurs, or when the call agent 101 restarts, the information server 102 instructs the call agent 101 to update the copied data stored therein. Further, the information server 102 can check the matching of the copied data stored in the call agent 101 to the master data stored in the information server 102 and, if they are unmatched, then the matching operation starts.

The maintenance terminal 103 is used to operate the information server 102. An operator uses the maintenance terminal 103 via graphical user interface to get access to the information server 102, check the status of the master data, and, if necessary, rewrite the master data.

Each call agent 101 performs the call control operation based on the copied data stored therein. In this example, the respective call agents use the copied data CA1 and CA2 to perform the call control. Each call agent is basically permitted to get access to the information server 102 when data checking or matching is performed, The information server 102 may be divided into plural servers depending on the type of information to be managed, the capacity of the server, or the like.

Figure 2:
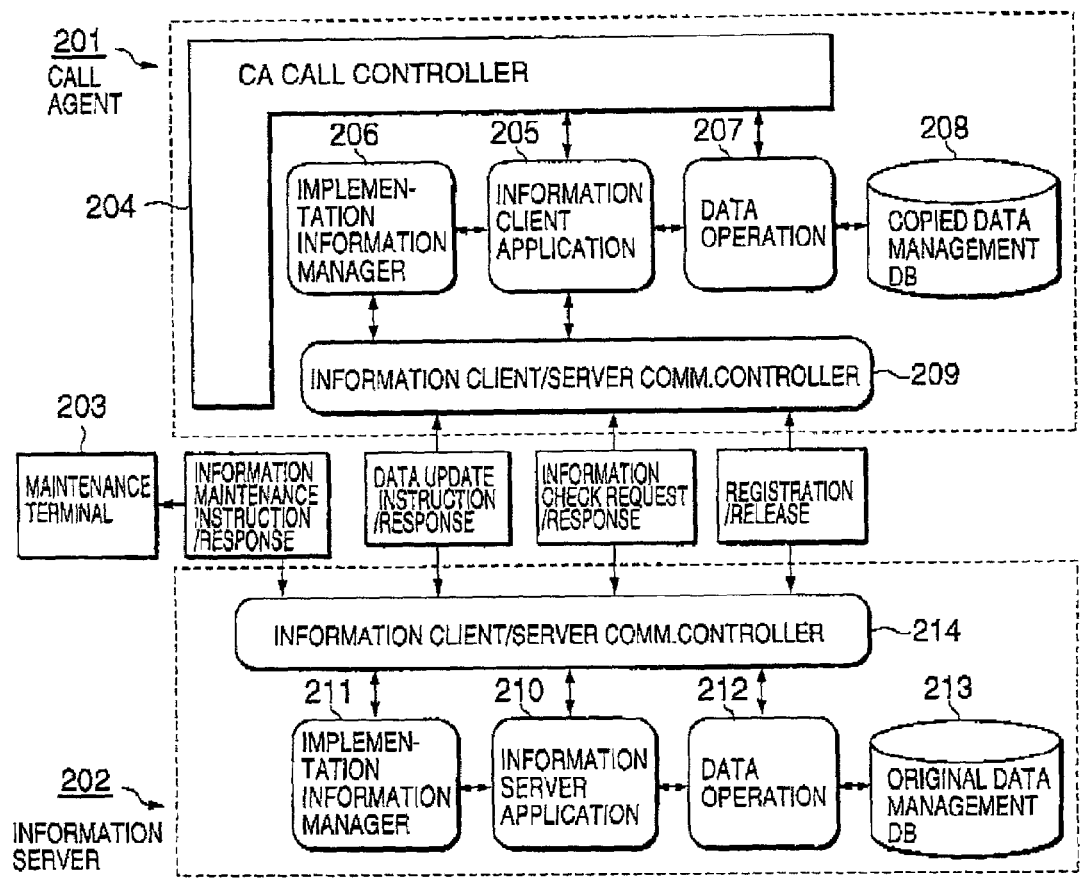
FIG. 2 is a detailed diagram showing the functional configuration of the first embodiment for explaining an operation thereof.

Referring to FIG. 2, each call agent 201 provides the call control to the packet-based network 100 and plays a role as a client of the information server 202.

The information server 202 performs centralized management of call control data implemented in the respective call agents 201 distributed in the packet-based network. If necessary, the information server 202 makes the data stored in a corresponding call agent 201 equal to the master data stored therein.

The maintenance terminal 203 performs maintenance and operation of the information server 202 and the call agent 201. Especially, the maintenance terminal 203 issues data update or search instruction, information check instruction, implementation information management instruction, status check request, and so on.

Call agent

More specifically, as shown in FIG. 2, the call agent 201 includes a call controller 204, an information client application section 205, an implementation information manager 206, a data operation section 207, a copied data management database 208, and an information client/server (C/S) communication controller 209.

The call controller 204 gets access to the data operation section 207 to search the copied data management database 208 for necessary data while performing the call control. When data updating is needed, the call controller 204 issues a data update instruction to the information client application section 205. contrarily, when receiving a data change notice from the information client application section 205, the call controller 204 updates data on a local memory as demanded.

The information client application section 205 performs the data updating operation in response to the data update instruction from the call controller 204 or the information server 202 and performs maintenance work including the data checking. Communication with the information server 202 is made through the information client/server (C/S) communication controller 209.

In the case of transmission, the information client application section 205 gets access to the implementation information manager 206 to define an information server storing data to be targeted and outputs to the information C/S communication controller 209 the identification information of the target server as well as targeted data identifying information. The maintenance of copied data stored in the database 208 is performed through the data operation section 207.

The implementation information manager 206 manages server identification information identifying the information server 202, which stores the master data of the copied data installed in the call agent 201. Accordingly, the information client application section 205 can get access to the information server 202 storing data to be targeted by referring to the implementation information manager 206. The implementation information manager 206 further manages the update history of copied data such as the update time of day, update result, update requesting source information, and update request content when failed in updating. The data operation section 207 is provided with an interface directly to the database 208, through which data updating and data referring can be made.

The information C/S communication controller 209 performs management of the address information of the information server 202 and the communication status, communication transaction management for associating an instruction with a response to the instruction, and encoding/decoding of communication messages. In the information C/S communication controller 209, the address information of the information server 202 is associated with the identification information of the information server 202. Further, the information C/S communication controller 209 performs dynamic registration and its release procedures between the information server 202 and the call agent 201 as a standard function thereof.

Information server

As shown in FIG. 2, the information server 202 includes an information server application section 210, an implementation information manager 211, a data operation section 212, an original data management database 213, and an information client/server (C/S) communication controller 214.

The information server application section 210 performs maintenance of original data stored in the database 213 and communication with call agents and the maintenance terminal 203. More specifically, in response to an information maintenance instruction from the maintenance terminal 203, the information server application section 210 gets access to the data operation section 212 and the implementation information manager 211 to update the original data and implementation information. Further, the information server application section 210 performs data checking and matching by exchanging instruction and response messages with call agents via the information C/S communication controller 214.

The implementation information manager 211 manages call agent identification information identifying respective ones of the call agents 201, which store the copied data to be targeted. The implementation information manager 211 further manages implementation status represented by the update time of day, address information of call agents to be targeted, and update result, associated with original data managed in the information server 202. The data operation section 212 is provided with an interface directly to the database 213, through which data updating and data referring can be made.

The communication control function of the information C/S communication controller 214 is the same as that of the information C/S communication controller 209 of the call agent 201. In addition, the information C/S communication controller 214 is provided with an interface to the maintenance terminal 203. When receiving a data reference request from the maintenance terminal 203, the information C/S communication controller 214 gets access to the data operation section 212 to extract data and transmits a response message back to the maintenance terminal 203. Further, when receiving an implementation information request, the information C/S communication controller 214 gets access to the implementation information manager 211 to collect information and transmits a response message back. The address information managed in the information server 202 includes a multicast address.

Second Embodiment

Figure 3:
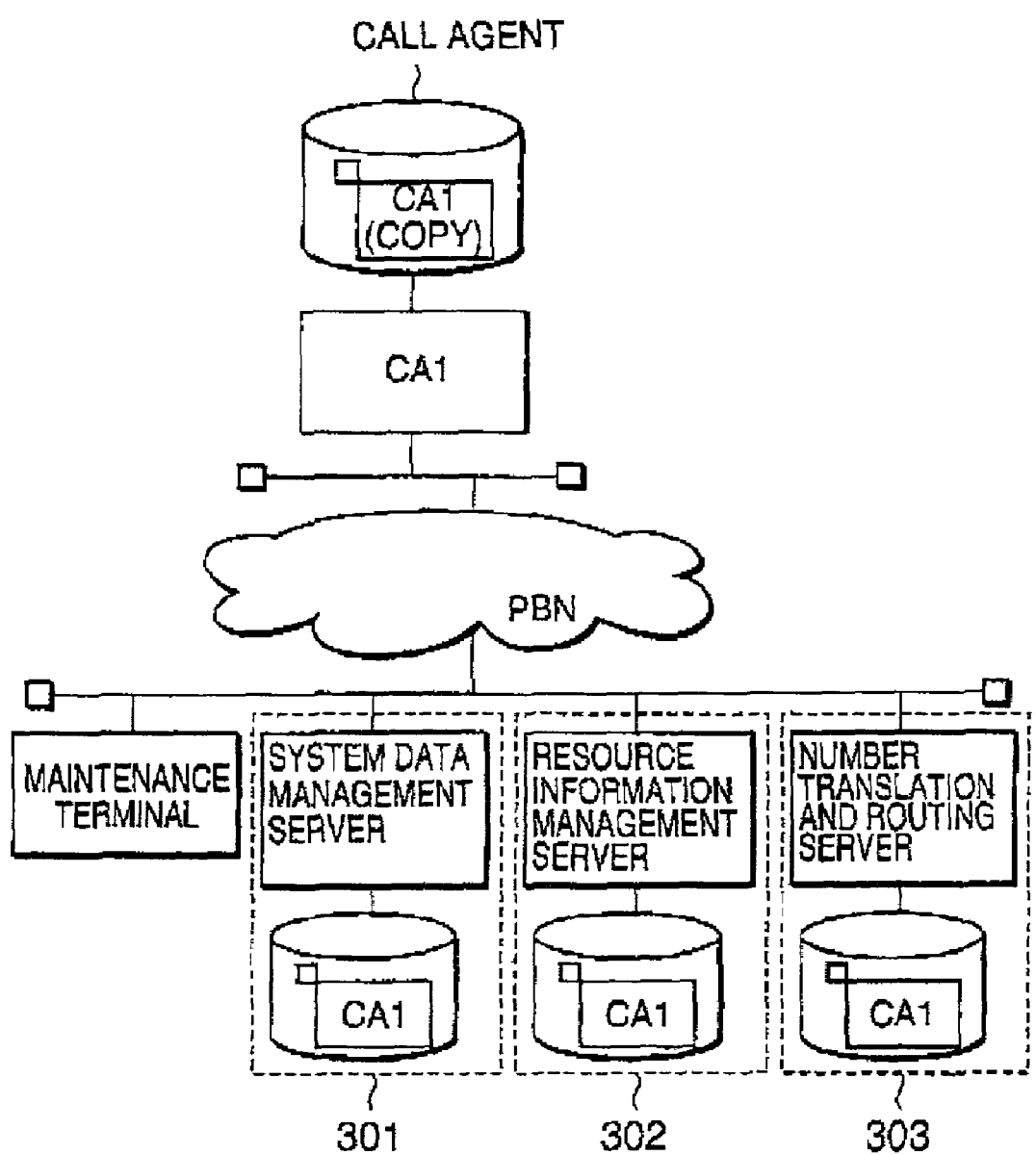
FIG. 3 is a diagram showing the configuration of a centralized call control data management system according to a second embodiment of the present invention.

Referring to FIG. 3, a centralized call control data management system according to a second embodiment of the present invention includes a plurality of call agents, a plurality of kinds of information servers 301–303, and a maintenance terminal, which are connected to the packet-based network (PBN). Here, the information servers 301–303 are configured according to functional distribution scheme.

More specifically, the information server 301 is a system data management server which manages system data required for operating a system of call agents. The information server 302 is a resource information management server which manages resource information required for call control operation of call agent, such as subscriber line information or trunk information and endpoint information accommodated in Media Gateway (MG). The information server 303 is a number translation and routing server which manages number information and routing information required for call control of call agent.

Third Embodiment

Figure 4:
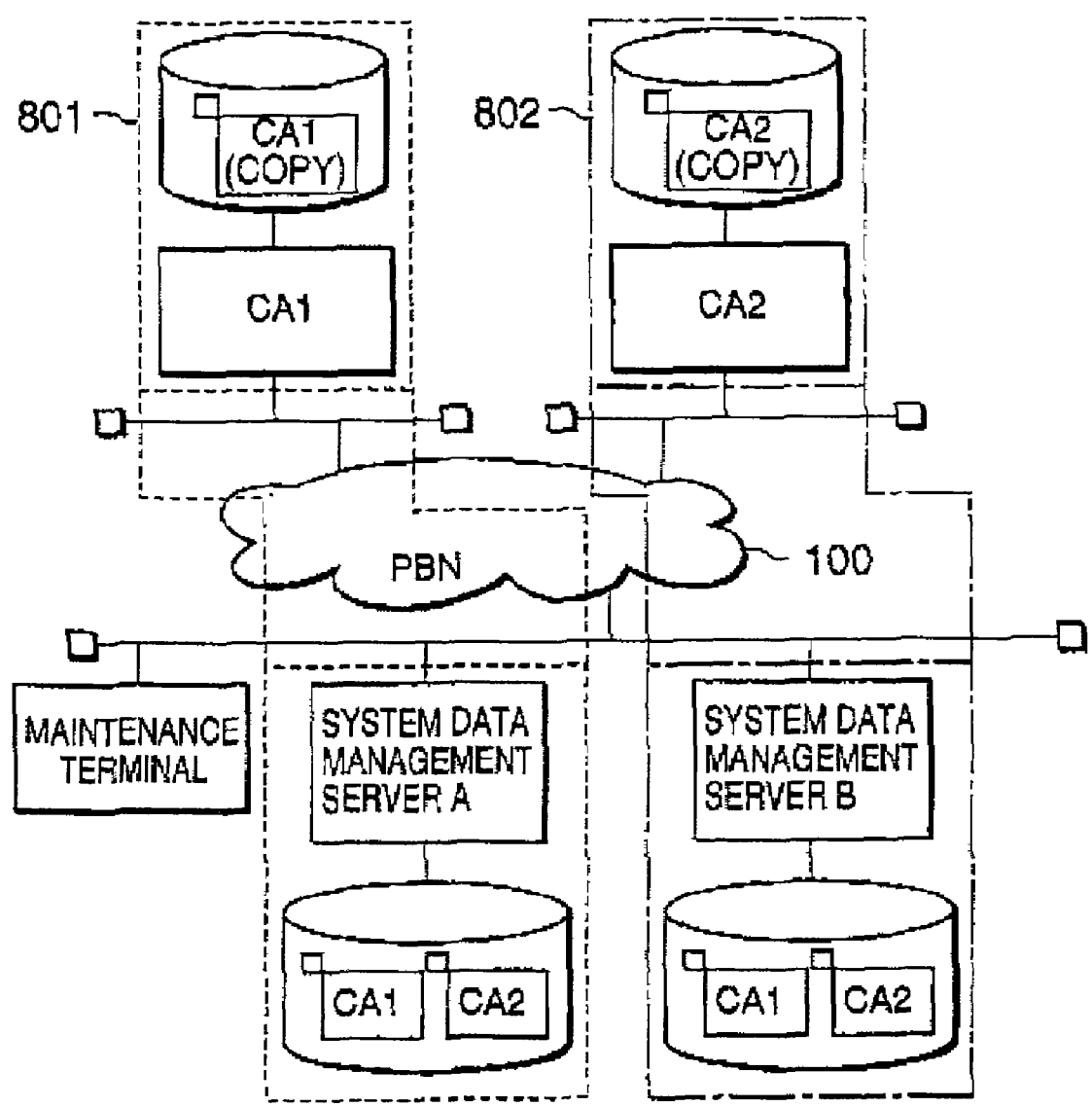
FIG. 4 is a diagram showing the configuration of a centralized call control data management system according to a third embodiment of the present invention.

Referring to FIG. 4, a centralized call control data management system according to a third embodiment of the present invention includes a plurality of call agents 801 and 802, a plurality of information servers A and B, and a maintenance terminal, which are connected to the packet-based network (PBN) Here, the information servers A and B are configured according to load distribution scheme.

More specifically, each of the system data management servers stores call control data for respective ones of the call agents. Each of the call agents 801 and 802 is managed by a different one of the system data management servers A and B. Which one of the system data management servers manages a different one of the call agents is determined depending on client/server registration procedure as described later. In this case, the system data management servers are associated with the call agents in a one-to-one relationship, so that none of the call agents is concurrently associated with two or more system data management servers, resulting in distributed load among the servers, In this example as shown in FIG. 4, the call agent 801 is associated with the system data management server A and the call agent 802 is associated with the system data management server B.

OPERATION

In the above-described embodiments, data updating, registration, data matching, and maintenance procedures will be described with reference to FIG. 2 and FIGS. 5–8.

Data updating

It is assumed that data has been registered in the database 213 of the information server 202 (see FIG. 2).

Figure 5A:
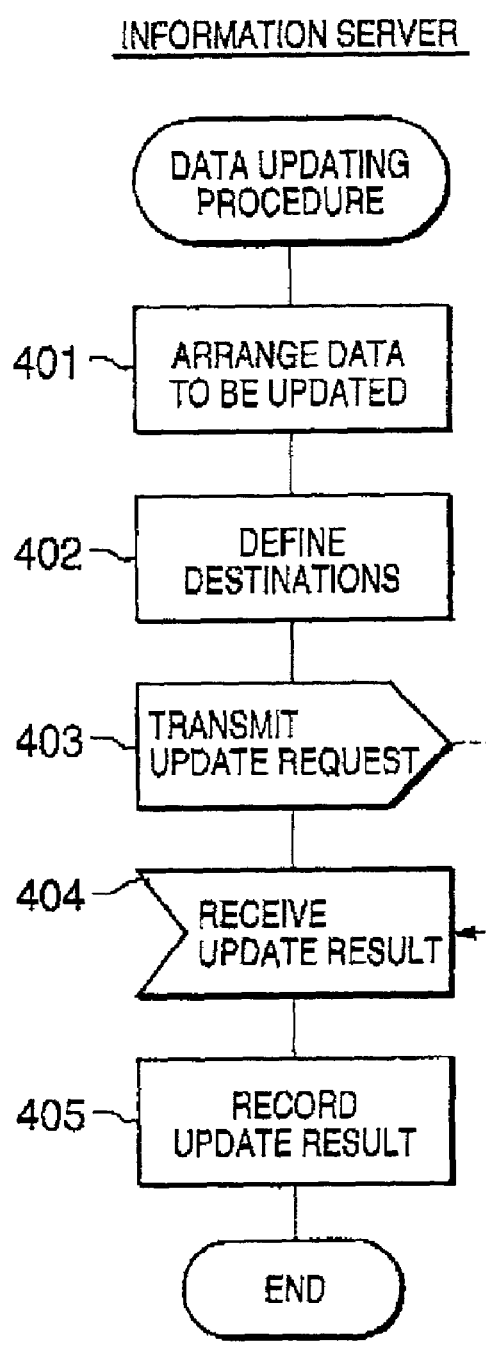
FIG. 5A is a flow chart showing a data updating operation in an information server according to the present invention.

Referring to FIG. 5A, data to be updated is arranged in the information server (step 401) and call agents to be instructed are designated (step 402). Subsequently, an update request message is edited and transmitted to the designated call agents 201 (step 403). Here, since the update request message is transmitted to a plurality of destinations, the multicast transmission is performed.

Figure 5B:
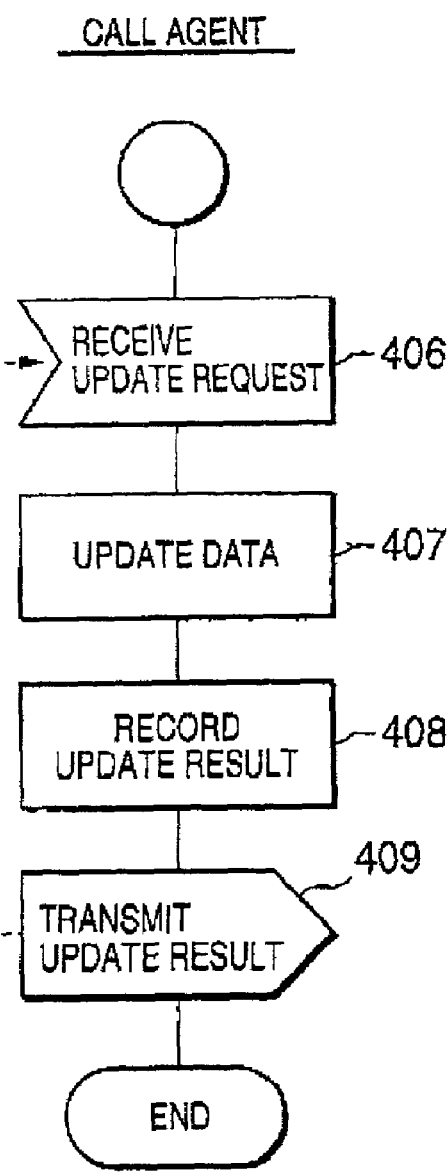
FIG. 5B is a flow chart showing a data updating operation in a call agent according to the present invention.

Referring to FIG. 5B, when receiving the update-request message from the information server 201 (step 406), the call agent 201 checks the contents of the received update request message and then updates the designated data (step 407). After having recorded a update result (success or failure) (step 408), an update result message is edited and transmitted to the source information server 202 (step 409).

Returning to FIG. 5A, when receiving the update result message from the call agent 201 (step 404), the information server 202 checks the contents of the received update result message and then updates the implementation information using the update result (step 405).

Registration

Referring to FIGS. 6A and 6B, first, the call agent 201 which is a client transmits a server search message to at least one information server 202 (step 501). Here, the destination address of the server search message is set to a fixed multicast address.

When receiving the server search message from the call agent 201 (step 514), the information server 202 checks the contents of the server search message (step 515) and determines whether the call agent 201 is allowed to be managed as a client of the information server 202 (step 516). If manageable (YES at step 516), then the information server 202 transmits a search response message to the call agent 201 (step 517). If the call agent 201 cannot be managed as a client (NO at step 516), then the information server 202 transmits a re-search instruction message to the call agent 201 (step 521). In this case, if there is found another information server that can manage the call agent as a client, then the found server is designated as a candidate to be searched for in the re-search instruction message.

Upon receipt of the search response message from the information server 202 (step 502), the call agent 201 checks the contents of the search response message and records the information server 202 as a server candidate (step 503). In the case where search response messages have been received from a plurality of information servers, a list of server candidates are created on a first-come, first-registered basis.

On the other hand, upon receipt of the re-search instruction message from the information server 202 (step 507), the call agent 201 checks the contents of the re-search instruction message (step 508) and, if another search candidate is designated (YES at step 508), then performs server searching again (step 501). When no search candidate is included (NO at step 508), a search result indicating failure of search is recorded (step 509).

The call agent 201 that has successfully recorded a server candidate edits a registration request message and transmits it to information servers in the order of the server candidate list (step 504).

When receiving the registration request message form the call agent 201 (step 519), the information server 202 checks the contents of the message and the load status and determines whether registration is possible (step 519). If registration is possible (YES at step 520), the call agent 201 that originated the registration request is registered as a client (step 523) and then edits and transmits a registration permission message back to the call agent 201 (step 524). When the registration is not possible (NO at step 520), a registration rejection message is edited and transmitted (step 522).

The call agent 201, when receiving the registration permission message from the information server 202 (step 505), records information related to the information server that permits the registration (step 506). When receiving the registration rejection message (step 510), the call agent 201 searches the server candidate list (step 511) and, if found (YES at step 512), performs registration requesting again (step 504). If not found (NO at step 512), the call agent 201 records a registration result indicating failure of registration (step 513).

Since the cancellation of registration is easily performed by exchanging registration release request and acknowledgement messages, the description thereof is omitted.

The dynamic registration and its cancellation as described above allow easy and flexible additional client and/or server and removal thereof on the network.

Data matching

Figure 7A:
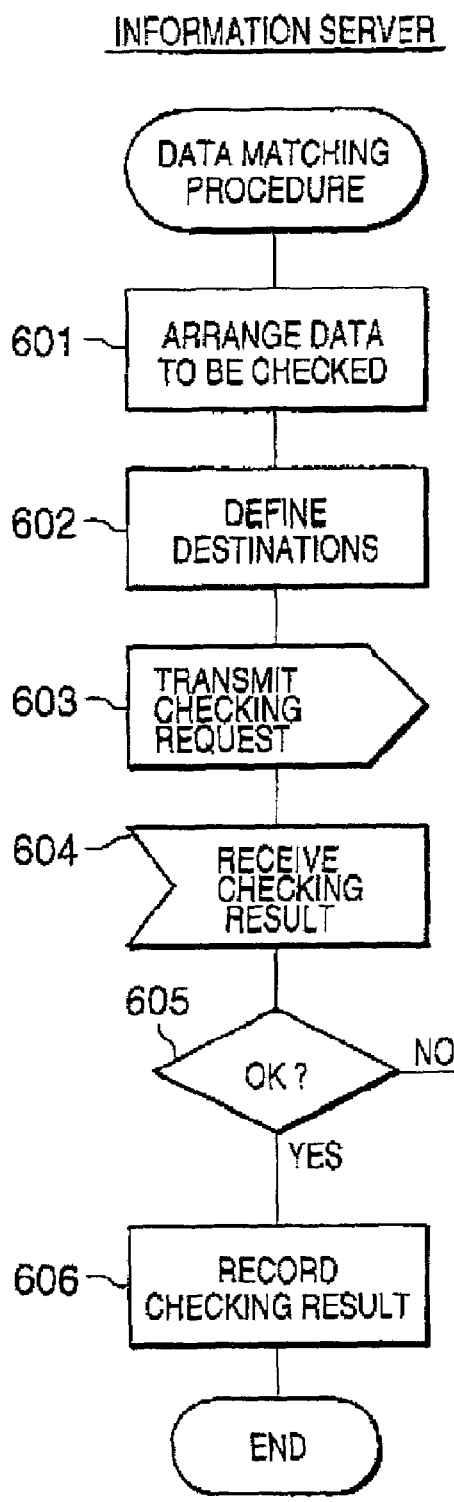
FIG. 7A is a flow chart showing a data matching operation in an information server according to the present invention.

Referring to FIG. 7A, data to be checked is arranged in the information server (step 601) and call agents to be targeted are designated (step 602). Subsequently, a checking request message is edited and transmitted to the designated call agents 201 (step 603). Here, since the checking request message is transmitted to a plurality of destinations, the multicast transmission is performed.

Figure 7B:
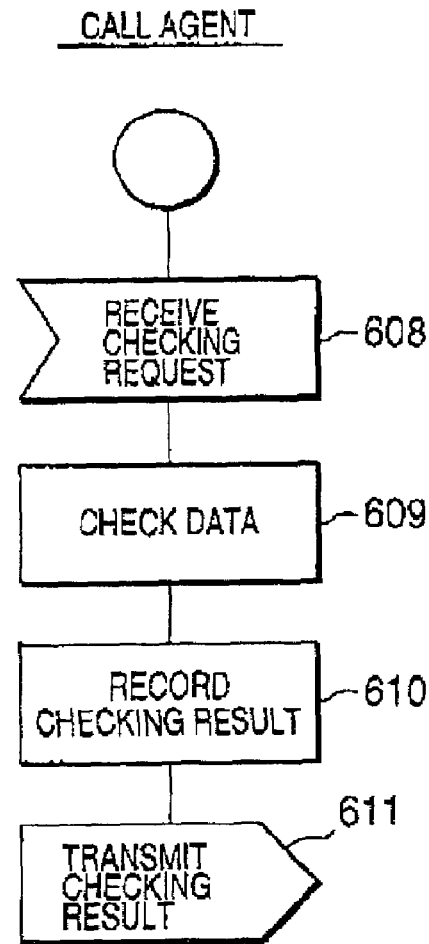
FIG. 7B is a flow chart showing a data matching operation in a call agent according to the present invention.

Referring to FIG. 7B, when receiving the checking request message from the information server 201 (step 608), the call agent 201 checks the contents of the received checking request message and then performs data checking whether the stored data matches the received data included in the checking request message (step 609). After having recorded a checking result (match or unmatch) (step 610), a checking result message is edited and transmitted to the source information server 202 (step 611).

Returning to FIG. 7A, when receiving the checking result message from the call agent 201 (step 604), the information server 202 checks the contents of the received checking result message (step 605). If matched (YES at step 605), the checking result is recorded (step 606) and, if unmatched (NO at step 605), then data updating procedure is performed (step 607).

Maintenance

Figure 8A:
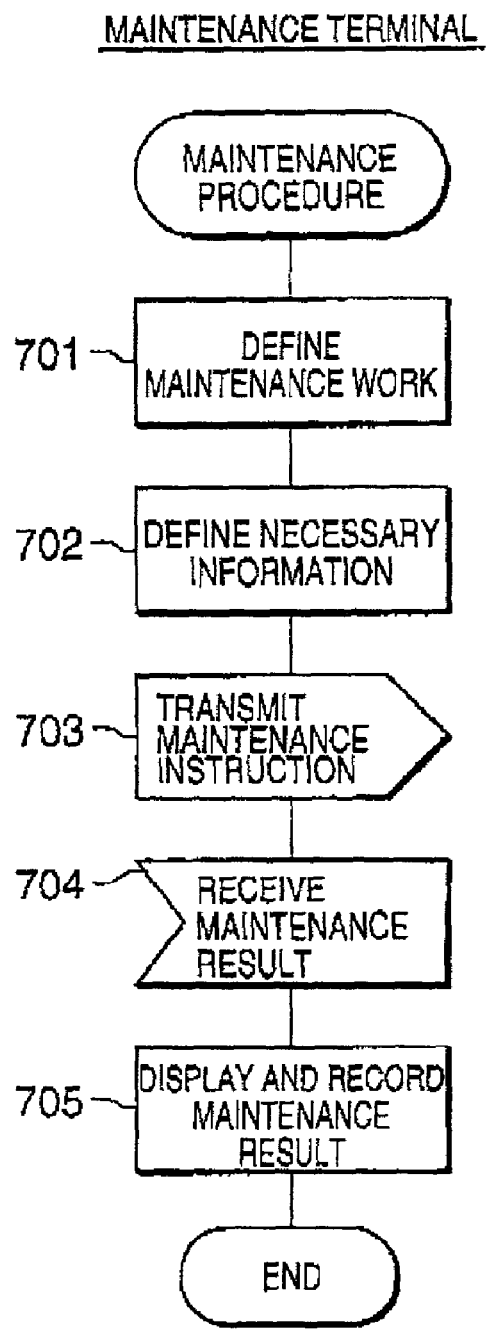
FIG. 8A is a flow chart showing a maintenance operation in a maintenance terminal according to the present invention.

Referring to FIG. 8A, an operator uses the maintenance terminal 203 to define maintenance work (step 701) and set necessary information (step 702). When the maintenance processing is started up by the operator, a maintenance instruction message is edited and transmitted to the information server 202 (step 703).

Figure 8B:
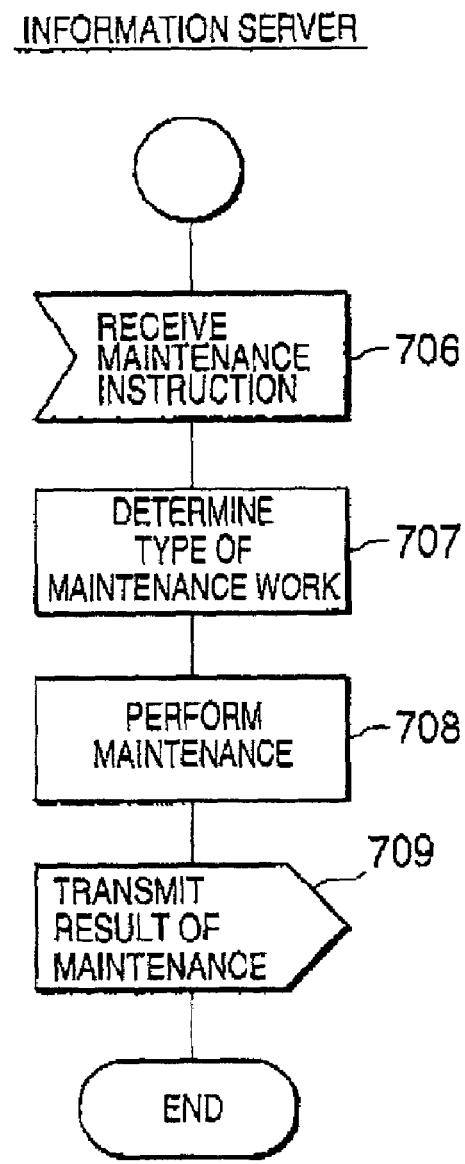
FIG. 8B is a flow chart showing a maintenance operation in an information server according to the present invention.

Referring to FIG. 8B, when receiving the maintenance instruction message from the maintenance terminal 203 (step 706), the information server 202 checks the contents of the received maintenance instruction message, determines the type of maintenance work (step 707), and then performs maintenance (step 708). A maintenance result (success or failure) and additional information are set in a maintenance result message and then transmitted to the maintenance terminal 203 (step 709).

Returning to FIG. 8A, when receiving the maintenance result message from the information server 202 (step 704), the maintenance result is displayed to the operator (step 705).

The invention claimed is:

1. A method for managing call control data installed in respective ones of a plurality of call agents which is distributed on a packet-based network, comprising the steps of:
 a) setting each of the call agents to be a client of a server which is provided on the packet-based network by the steps of:
  a.1) the call agent transmitting a server search message to the server;
  a.2) when receiving the server search message, the server determining whether the call agent can be managed;

a.3) when it is determined that the call agent can be managed, the server transmitting a response message back to the call agent;

a.4) when receiving the response message, the call agent transmitting a registration request to the server; and a.5) when receiving the registration request, the server registering the call agent as a client when the call agent satisfies registration requirement;

wherein when it is determined in the step (a.2) that the call agent cannot be managed, the server transmits a re-search instruction message to the call agent, the re-search instruction message designating another server, and wherein, when receiving the re-search instruction, the call agent transmits a server search message to the designated server;

at the server, b) storing master call control data required in respective ones of the call agents;

c) managing the master call control data; and at each of the call agents, d) storing a copy of corresponding master call control data so that the call agents perform network-wide call control.

2. The method according to claim claim 1, wherein, when a change occurs in the master call control data, the server instructs a corresponding call agent to update the copy of the corresponding master call control data stored in the corresponding call agent so as to reflect the change.

3. The method according to claim 1, further comprising the steps of:

transmitting a data check request from the server to a designated call agent;

checking whether copied call control data stored in the designated call agent matches a corresponding master call control data stored in the server; and when the copied call control data does not match the corresponding master call control data, instructing the designated call agent to update the copied call control data so as to make it equal to the corresponding master call control data.

4. The method according to claim 1, further comprising the steps of:

transmitting a data check request from a call agent to the server;

checking whether copied call control data stored in the call agent matches a corresponding master call control data stored in the server; and when the copied call control data does not match the corresponding master call control data, updating the copied call control data so as to make it equal to the corresponding master call control data.

* * * * *